United States Patent
Aruga et al.

(10) Patent No.: US 12,081,251 B2
(45) Date of Patent: Sep. 3, 2024

(54) PROCESSING CIRCUIT, RADIO COMMUNICATION CIRCUIT, AND SEMICONDUCTOR INTEGRATED CIRCUIT

(71) Applicant: Socionext Inc., Kanagawa (JP)

(72) Inventors: Kenta Aruga, Kanagawa (JP); Takashi Miyazaki, Kanagawa (JP); Daisuke Kimura, Kanagawa (JP); Yasuhiro Majima, Kanagawa (JP); Shunichiro Masaki, Kanagawa (JP); Shunsuke Hirano, Kanagawa (JP)

(73) Assignee: SOCIONEXT INC., Yokohama (JP)

( * ) Notice: Subject to any disclaimer, the term of this patent is extended or adjusted under 35 U.S.C. 154(b) by 112 days.

(21) Appl. No.: 18/057,054

(22) Filed: Nov. 18, 2022

(65) Prior Publication Data
US 2023/0163797 A1 May 25, 2023

(30) Foreign Application Priority Data
Nov. 24, 2021 (JP) .................. 2021-190349

(51) Int. Cl.
*H04B 1/10* (2006.01)
*H04L 27/00* (2006.01)

(52) U.S. Cl.
CPC .......... *H04B 1/10* (2013.01); *H04L 27/0008* (2013.01)

(58) Field of Classification Search
CPC ............................. H04B 1/10; H04L 27/0008
USPC ....................................................... 375/340
See application file for complete search history.

(56) References Cited

U.S. PATENT DOCUMENTS

| 2006/0146192 | A1 | 7/2006 | Tashiro | |
|---|---|---|---|---|
| 2014/0300397 | A1* | 10/2014 | Huang | H03K 5/15013 327/161 |
| 2015/0229312 | A1* | 8/2015 | Sekiya | H03L 7/0814 327/158 |
| 2018/0205388 | A1 | 7/2018 | Aruga et al. | |

(Continued)

FOREIGN PATENT DOCUMENTS

| JP | H01-241222 A | 9/1989 |
|---|---|---|
| JP | 2007-088703 A | 4/2007 |
| JP | 2008-160596 A | 7/2008 |

(Continued)

OTHER PUBLICATIONS

Single-Chip 5.8GHz DSRC Transceiver with Dual-Mode of ASK and Pi/4-QPSK issued on Jan. 1, 2008.

*Primary Examiner* — Leila Malek
(74) *Attorney, Agent, or Firm* — Rimon P.C.

(57) ABSTRACT

A processing circuit includes: a clock generating circuit configured to generate, based on a reference clock signal and a frequency division ratio, a first clock signal; a frequency dividing and delay circuit configured to generate a second clock signal to have a first phase difference with the reference clock signal by dividing the frequency of the first clock signal and delaying the first clock signal based on a phase shift set signal and the frequency division ratio; an analog-to-digital converter circuit configured to convert an analog signal into a digital signal based on the first clock signal and a conversion trigger signal indicating a sampling period and a conversion period; and a control circuit configured to generate the conversion trigger signal to have the same cycle as the second clock signal based on the frequency division ratio and the first clock signal.

20 Claims, 10 Drawing Sheets

(56) References Cited

U.S. PATENT DOCUMENTS

2018/0269892 A1 9/2018 Kurose

FOREIGN PATENT DOCUMENTS

| | | |
|---|---|---|
| JP | 2009-005279 A | 1/2009 |
| JP | 2017-079451 A | 4/2017 |
| JP | 2018-152768 A | 9/2018 |
| WO | 2018/207499 A1 | 11/2018 |

* cited by examiner

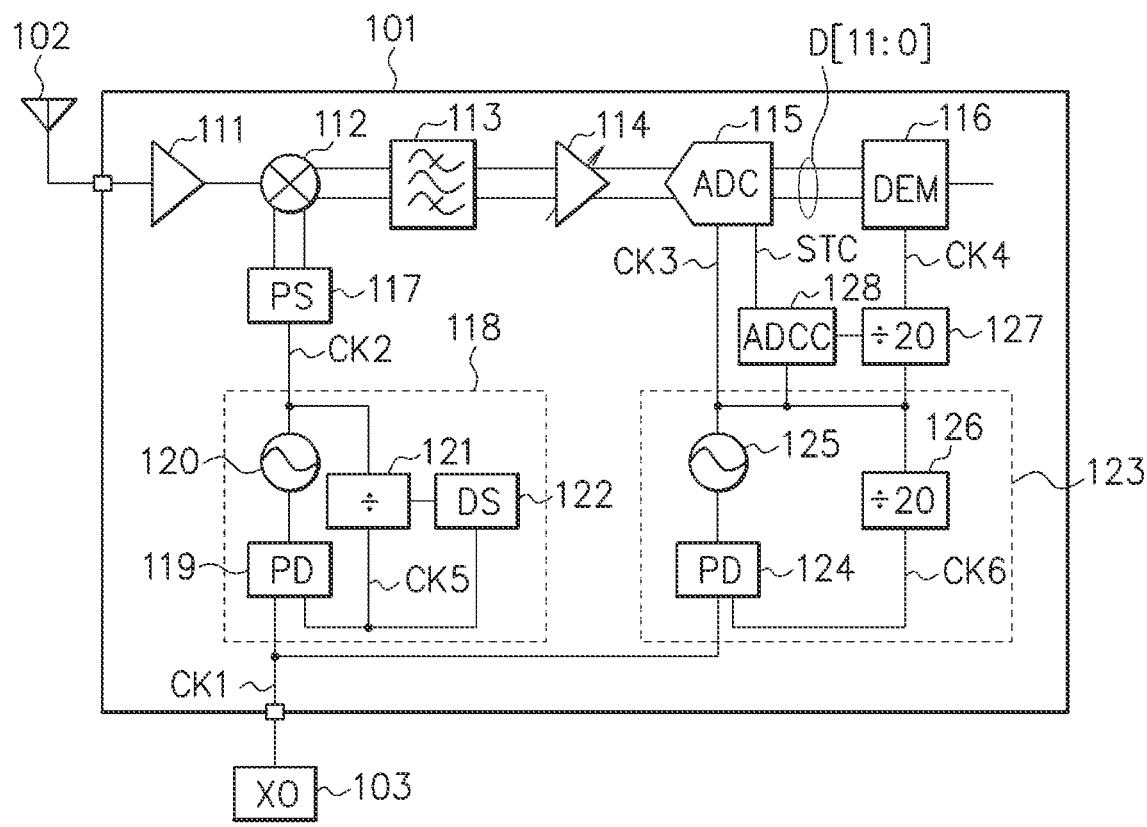
F I G. 1

F I G. 4
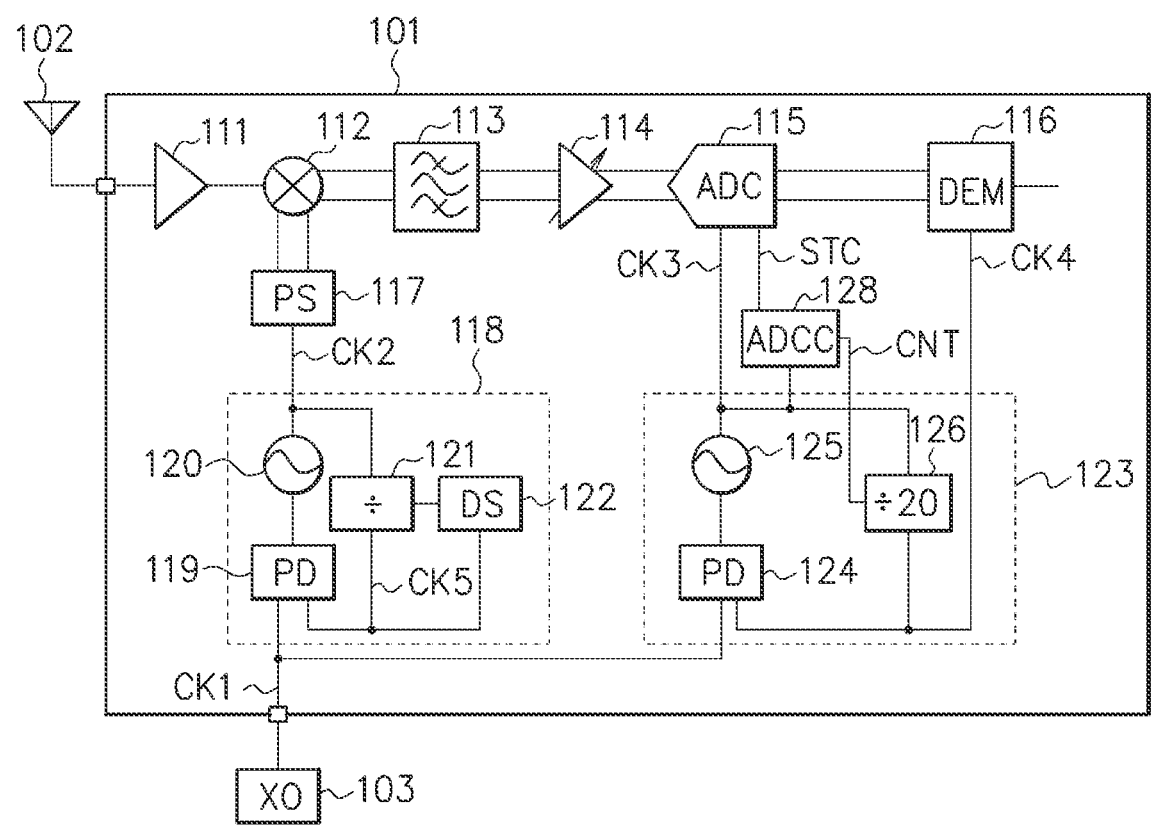

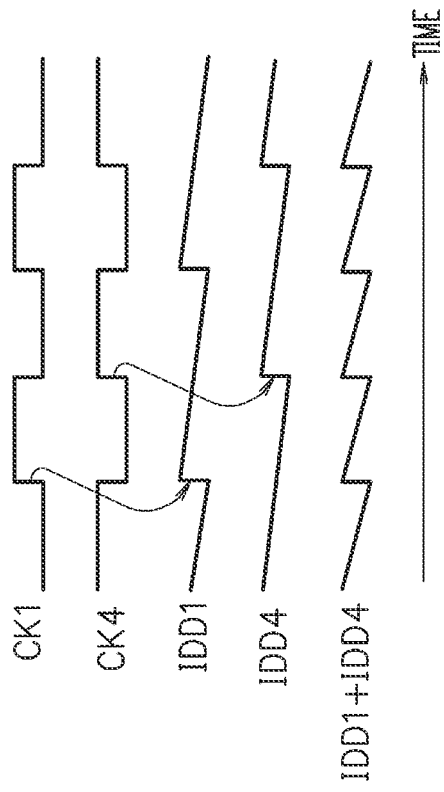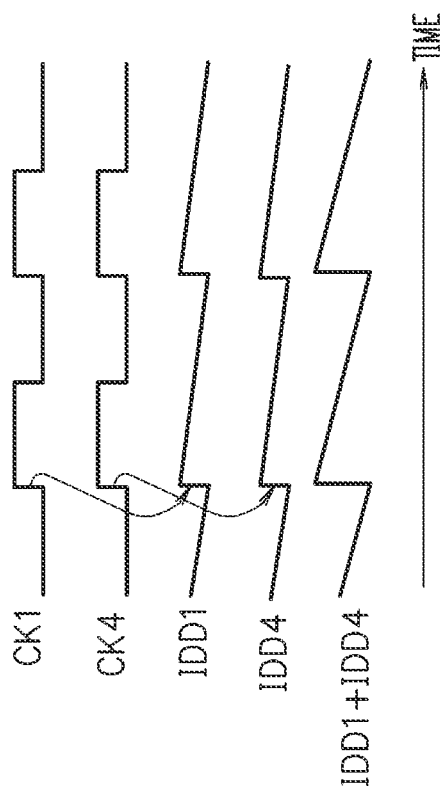

F I G. 10A
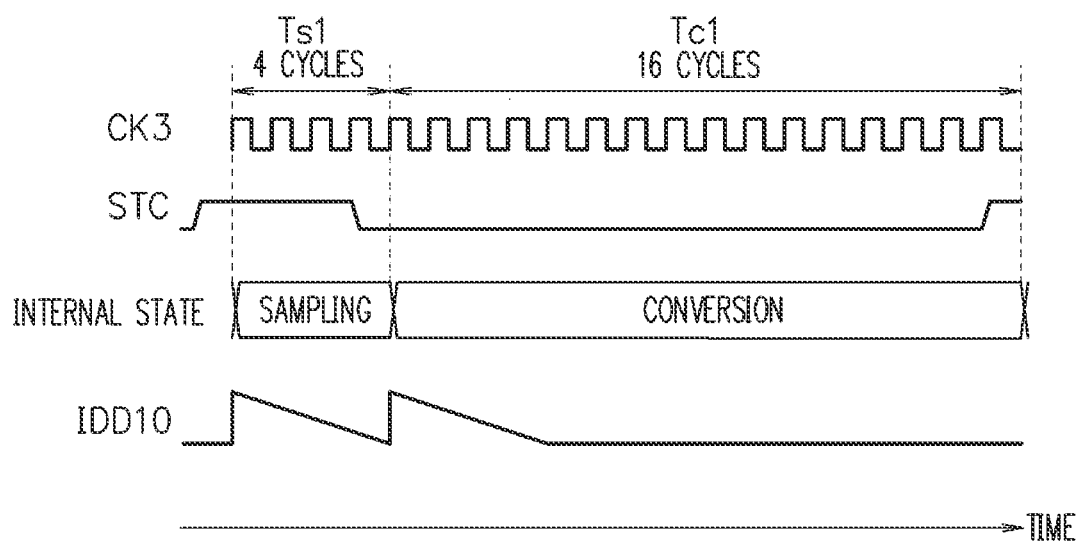
F I G. 10B
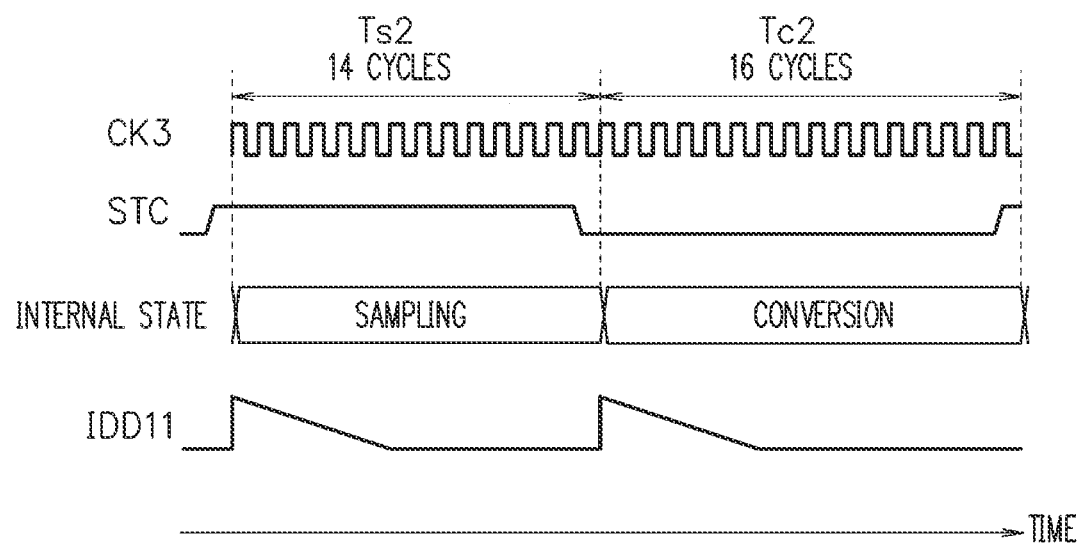

PROCESSING CIRCUIT, RADIO COMMUNICATION CIRCUIT, AND SEMICONDUCTOR INTEGRATED CIRCUIT

CROSS-REFERENCE TO RELATED APPLICATION

This application is based upon and claims the benefit of priority of the prior Japanese Patent Application No. 2021-190349, filed on Nov. 24, 2021, the entire contents of which are incorporated herein by reference.

FIELD

The embodiments discussed herein are directed to a processing circuit, a radio communication circuit, and a semiconductor integrated circuit.

BACKGROUND

Patent Document 1 has described a wireless communication device including: a communication unit that is capable of transmitting/receiving radio waves for narrow band communication; and a conversion unit that converts, based on a first reference signal, a reception signal generated according to reception of the radio wave for narrow band communication into an intermediate frequency. A generation unit generates, based on a second reference signal having a frequency different from that of the first reference signal, a transmission signal to be used for transmission of the radio waves for narrow band communication. A supply unit is capable of performing switching between the supply of the first reference signal to the conversion unit and the supply of the second reference signal to the generation unit.

Patent Document 2 has described an analog to digital converter including: a first circuit configured to generate an analog voltage based on a sampled analog signal and a digital code; and a clock generator configured to generate a first clock signal. A comparator is configured to receive the analog voltage output from the first circuit and perform digital output based on the first clock signal. A DAC control circuit is configured to generate the digital code based on the digital output of the comparator. The clock generator varies a delay period, which is from the end of sampling of the analog signal to the start of generating the first clock signal, for each sampling of the analog signal.

[Patent Document 1] International Publication Pamphlet No. WO 2018/207499
[Patent Document 2] Japanese Laid-open Patent Publication No. 2018-152768

Since radio communication devices receive weak radio waves, they are sensitive to even the slightest noise and are prone to noise-based degradation of reception sensitivity.

SUMMARY

A processing circuit includes: a clock generating circuit configured to generate, based on a reference clock signal and a frequency set signal, a first clock signal having a frequency higher than a frequency of the reference clock signal; a frequency dividing and delay circuit configured to generate a second clock signal having a frequency lower than the frequency of the first clock signal so that the second clock signal has a first phase difference with the reference clock signal by dividing the frequency of the first clock signal and delaying the first clock signal based on a phase shift set signal and the frequency set signal; an analog-to-digital converter circuit configured to convert an analog signal into a digital signal based on the first clock signal and a conversion trigger signal indicating a sampling period and a conversion period; a digital signal processing circuit configured to execute processing according to the digital signal based on the second clock signal; and a control circuit configured to generate the conversion trigger signal so that the second clock signal has the same cycle as the second clock signal based on the frequency set signal and the first clock signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a configuration example of a radio communication circuit according to a first comparative example;

FIG. 4 is a diagram illustrating a configuration example of a radio communication circuit according to a second comparative example;

FIG. 9A and FIG. 9B each are a timing chart illustrating examples of clock signals and currents; and FIG. 10A and FIG. 10B each are a timing chart illustrating an operation example of a radio communication circuit.

DESCRIPTION OF EMBODIMENTS

Figure 2:
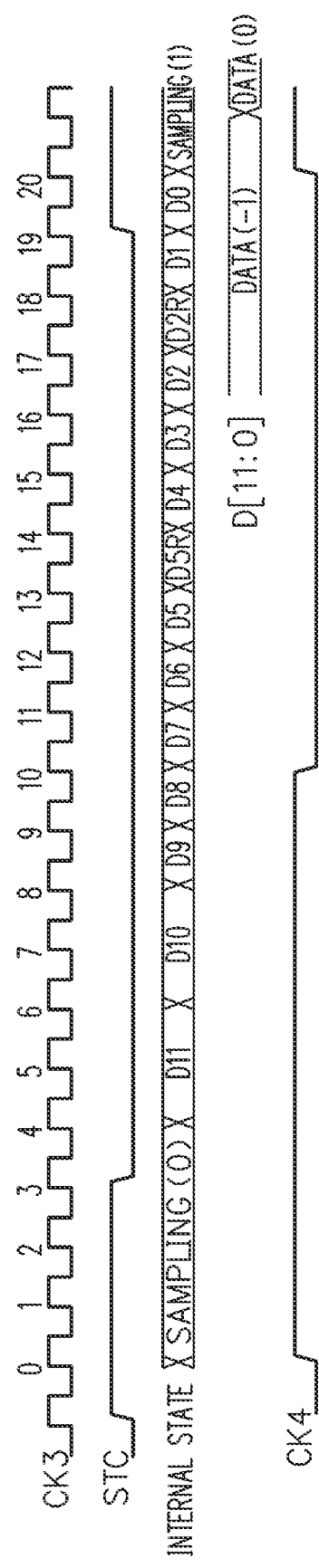
FIG. 2 is a timing chart illustrating examples of a clock signal, a conversion trigger signal, an internal state of an analog-to-digital converter circuit, and output data of the analog-to-digital converter circuit.

FIG. 1 is a diagram illustrating a configuration example of a radio communication circuit 101 according to a first comparative example. The radio communication circuit 101 is used for an electric toll collection system (ETC), for example. The ETC is a toll payment system for toll roads and has been installed throughout Japan. The dedicated short-range communication (DSRC) system enables the use of ETC automatic collection technology (bidirectional communication technology between an on-board device and a roadside) in various fields. The DSRC has been expected to be used in fields such as parking lot management, logistics management, and gasoline bill payment, for example.

The DSRC is radio communication that uses the 5.8 GHz band, and is specified in the ARIB STD-T75 standard. Two modulation schemes of ASK and π/4 shift QPSK are used. For the ASK modulation, a split-phase encoded 2048 kbaud modulation signal is used, and the signal transmission rate is 1024 kbps. For the QPSK modulation, a four-phase modulated 2048 kbaud modulation signal is used, and the signal transmission rate is 4096 kbps. ASK and QPSK both have a symbol rate of 2048 kbaud, and thus, the radio communication circuit 101 can be shared and implemented as one compatible with both the modulation schemes.

In the radio communication circuit 101, signal processing that can be performed digitally is desirably implemented in logic circuits as much as possible. This is because the processing results of digital circuits are definitive and it is possible to eliminate various problems to occur in analog circuits, such as individual differences in characteristics due to manufacturing variations, degradation of characteristics due to device noise, and temperature drift of characteristics, for example. When the scale of digital signal processing increases, there have conventionally been both scale and speed constraints. However, as manufacturing processes evolve and lithography shrinks, the constraints on logic scale are rapidly shrinking.

One of the key components for the radio communication circuit 101 is an analog-to-digital converter circuit (ADC) 115. The analog-to-digital converter circuit 115 for digitizing analog signals is provided at the boundary between an analog signal processing circuit and a digital signal processing circuit. The analog-to-digital converter circuit 115 converts an input signal into a digital code according to the magnitude of a signal voltage.

An antenna 102 and an oscillation circuit 103 are connected to the radio communication circuit 101. The radio communication circuit 101 is a reception circuit, and includes a low noise amplifier circuit (LNA) 111, a quadrature mixer circuit 112, a band-pass filter circuit 113, a variable gain amplifier circuit (VGA) 114, the analog-to-digital converter circuit 115, and a demodulation circuit 116.

The radio communication circuit 101 further includes a phase shift circuit 117, a phase locked loop (PLL) circuit 118, a phase locked loop circuit 123, a frequency dividing circuit 127, and an analog-to-digital converter controller (ADCC) 128.

The antenna 102 wirelessly receives radio waves and outputs a received signal to the low noise amplifier circuit 111. The received signal is an ASK modulated or QPSK modulated modulation signal. The low noise amplifier circuit 111 amplifies the received signal received by the antenna 102 and outputs the amplified received signal to the quadrature mixer circuit 112.

The oscillation circuit 103 generates a reference clock signal CK1. The reference clock signal CK1 is 32.768 MHz, for example. The phase locked loop circuit 118 generates a clock signal CK2 based on the reference clock signal CK1. The frequency of the clock signal CK2 is the frequency offset by the intermediate frequency relative to the frequency of the received signal. For example, when selecting a channel of 5800 MHz in the quadrature mixer circuit 112 whose intermediate frequency is 3.072 MHz, the frequency of the clock signal CK2 is 5803.072 MHz or 5796.928 GHz. Thus, the decimal frequency division type (fractional frequency division type) phase locked loop circuit 118 is used in order to generate the clock signal CK2 having a frequency that is not an integer ratio to the frequency of the reference clock signal CK1.

The phase locked loop circuit 118 includes a phase detection circuit (phase comparison circuit) 119, a voltage-controlled oscillation circuit (VCO) 120, a frequency dividing circuit 121, and a delta-sigma modulation circuit 122. The phase detection circuit 119 detects a phase difference between the reference clock signal CK1 and a clock signal CK5 and outputs a voltage based on the detected phase difference to the voltage-controlled oscillation circuit 120. The voltage-controlled oscillation circuit 120 generates a clock signal CK2 having a frequency based on the voltage. The delta-sigma modulation circuit 122 controls the frequency dividing circuit 121 based on the clock signal CK5. The frequency dividing circuit 121 outputs the clock signal CK5 obtained by dividing the frequency of the clock signal CK2 by a decimal (a fraction) to the phase detection circuit 119 under the control of the delta-sigma modulation circuit 122. The frequency ratio of the clock signals CK2 and CK5 is a decimal (fraction). Therefore, the frequency ratio of the clock signals CK1 and CK2 is also a decimal (fraction). The phase locked loop circuit 118 performs a feedback control so as to make the phase difference between the clock signals CK1 and CK5 approach 0, and generates the clock signal CK2.

The phase shift circuit 117 shifts the phase of the clock signal CK2, to thereby output a 0° clock signal and a 90° clock signal to the quadrature mixer circuit 112. The 0° clock signal and the 90° clock signal have a phase difference of 90° from each other.

The quadrature mixer circuit 112 mixes (multiplies) the received signal output from the low noise amplifier circuit 111 with the 0° clock signal, and mixes (multiplies) the received signal output from the low noise amplifier circuit 111 with the 90° clock signal. Then, the quadrature mixer circuit 112 outputs an I signal (in-phase signal) obtained by mixing the received signal and the 0° clock signal, and a Q signal (quadrature signal) obtained by mixing the received signal and the 90° clock signal.

The band-pass filter circuit 113 removes unnecessary frequency components of the I signal and the Q signal output from the quadrature mixer circuit 112, and outputs the resultant I signal and Q signal after removal. The variable gain amplifier circuit 114 amplifies the I signal and the Q signal output from the band-pass filter circuit 113 and outputs the amplified I signal and Q signal to the analog-to-digital converter circuit 115.

For example, if the intermediate frequency is 3.072 MHz and the exclusive frequency bandwidth of the dedicated short-range communication is 4.4 MHz, the analog-to-digital converter circuit 115 comes to convert signals of up to 3.072 MHz+4.4 MHz/2=5.272 MHz. Therefore, for example, if the sample rate is set to 32.768 MHz, the analog-to-digital converter circuit 115 can perform conversion at a sufficiently high sample rate with respect to the signal frequency.

It is rational for the analog-to-digital converter circuit 115 to employ a successive approximation type analog-to-digital converter circuit, for example, in a CMOS technology node with a gate length of 90 nanometers and more. When performing analog-to-digital conversion of a single point of an analog signal, the successive approximation type analog-to-digital converter circuit 115 first samples the electric charge corresponding to an analog signal voltage and then performs a binary search to obtain a 12-bit digital value, for example. That is, the successive approximation type analog-to-digital converter circuit 115 needs a clock signal CK3 having a frequency that is, for example, 20 times the sample rate. Therefore, the phase locked loop circuit 123 multiplies the reference clock signal CK1 by 20 times to generate the clock signal CK3. For example, the frequency of the reference clock signal CK1 is 32.768 MHz, and the frequency of the clock signal CK3 is 655.36 MHz. Thus, the integer frequency division type phase locked loop circuit 123 is used to generate the clock signal CK3 having a frequency that is an integer ratio to (20 times) the frequency of the reference clock signal CK1.

The phase locked loop circuit 123 includes a phase detection circuit 124, a voltage-controlled oscillation circuit 125, and a frequency dividing circuit 126. The phase detection circuit 124 detects a phase difference between the reference clock signal CK1 and a clock signal CK6 and outputs a voltage based on the detected phase difference to the voltage-controlled oscillation circuit 125. The voltage-controlled oscillation circuit 125 generates a clock signal CK3 having a frequency based on the voltage. The frequency dividing circuit 126 outputs the clock signal CK6 obtained by dividing the frequency of the clock signal CK3 by 20 to the phase detection circuit 124. The frequency ratio of the clock signals CK3 and CK6 is 20 times. Therefore, the frequency ratio of the clock signals CK1 and CK3 is also 20 times. The phase locked loop circuit 123 performs a feedback control so as to make the phase difference between the clock signals CK1 and CK6 approach 0, and generates the clock signal CK3.

The frequency dividing circuit 127 outputs a clock signal CK4 obtained by dividing the frequency of the clock signal CK3 by 20 to the demodulation circuit 116. For example, the frequency of the clock signal CK3 is 655.36 MHz. The frequency of the clock signal CK4 is 1/20 times the frequency of the clock signal CK3, which is 32.768 MHz, for example. Further, the frequency dividing circuit 127 repeatedly counts a count value from 0 to 19 based on the clock signal CK3, and outputs the count value to the ADCC 128.

The ADCC 128 is an analog-to-digital converter controller, and outputs a conversion trigger signal STC to the analog-to-digital converter circuit 115 based on the clock signal CK3 and the count value from the frequency dividing circuit 127. The conversion trigger signal STC is a signal indicating a sampling period and a conversion period for analog-to-digital conversion.

The analog-to-digital converter circuit 115 converts an analog signal output from the variable gain amplifier circuit 114 into a digital signal based on the clock signal CK3 and the conversion trigger signal STC. Specifically, the analog-to-digital converter circuit 115 converts analog I and Q signals output from the variable gain amplifier circuit 114 into digital I and Q signals.

The demodulation circuit 116 performs ASK demodulation processing or QPSK demodulation processing on the digital I signal and Q signal output from the analog-to-digital converter circuit 115 based on the clock signal CK4 to restore data. The demodulation circuit 116 needs to operate in synchronization with the analog-to-digital converter circuit 115, and thus receives the clock signal CK4 generated by dividing the frequency of the clock signal CK3 of the analog-to-digital converter circuit 115 by 20, for example. The analog-to-digital converter circuit 115 and the demodulation circuit 116 operate according to the logic starting from the edge of the clock signal CK3, so that the synchronous relationship between the analog-to-digital converter circuit 115 and the demodulation circuit 116 is maintained.

FIG. 2 is a timing chart illustrating examples of the clock signal CK3, the conversion trigger signal STC, an internal state of the analog-to-digital converter circuit 115, output data D[11: 0] of the analog-to-digital converter circuit 115, and the clock signal CK4. The cycle of the conversion trigger signal STC is 20 times the cycle of the clock signal CK3. The cycle of the clock signal CK4 is the same as the cycle of the conversion trigger signal STC, and is 20 times the cycle of the clock signal CK3.

Of the conversion trigger signal STC, the high level period indicates a sampling period and the low level period indicates a conversion period. The analog-to-digital converter circuit 115 receives the clock signal CK3 and the conversion trigger signal STC. When the conversion trigger signal STC is asserted, the analog-to-digital converter circuit 115 starts sampling the analog signal in a cycle 0 at the next rising edge of the clock signal CK3 (in the cycle 0 in the drawing). Then, when the conversion trigger signal STC is negated, the analog-to-digital converter circuit 115 finishes the sampling of the analog signal in the cycle 0 at the next rising edge of the clock signal CK3 (in a cycle 4 in the drawing), and starts a binary search for analog-to-digital conversion. The binary search is determined one bit at a time sequentially, starting with the highest of 12-bit binary codes D11-D0.

The internal state in FIG. 2 indicates that judgment is performed sequentially with D11 to D0 of the 12-bit binary codes, where the states of D5R and D2R are included. DER and D2R each represent redundant judgment, and are processing for relieving judgment errors contained up to that time. A representative example of the cause of the judgment error is that a parasitic inductance of the package of the radio communication circuit 101 causes a settling failure of the analog-to-digital converter circuit 115. After completing the binary search in a cycle 20, the analog-to-digital converter circuit 115 updates the output data D[11: 0] of the analog-to-digital converter circuit 115 at the next rising edge of the clock signal CK3.

The clock signal CK4 is a clock signal obtained by dividing the frequency of the clock signal CK3 by 20 by the frequency dividing circuit 127 and is supplied to the demodulation circuit 116. The demodulation circuit 116 is driven by the rising edge of the clock signal CK4. Here, the conversion trigger signal STC and the clock signal CK4 have the same cycle as each other, and are different in the number of cycles in the high level period and the low level period. Therefore, the ADCC 128 generates the conversion trigger signal STC based on the count value of the 20 counters inside the frequency dividing circuit 127. The connection between the ADCC 128 and the frequency dividing circuit 127 indicates that the ADCC 128 refers to the count value of the frequency dividing circuit 127.

Figure 3:
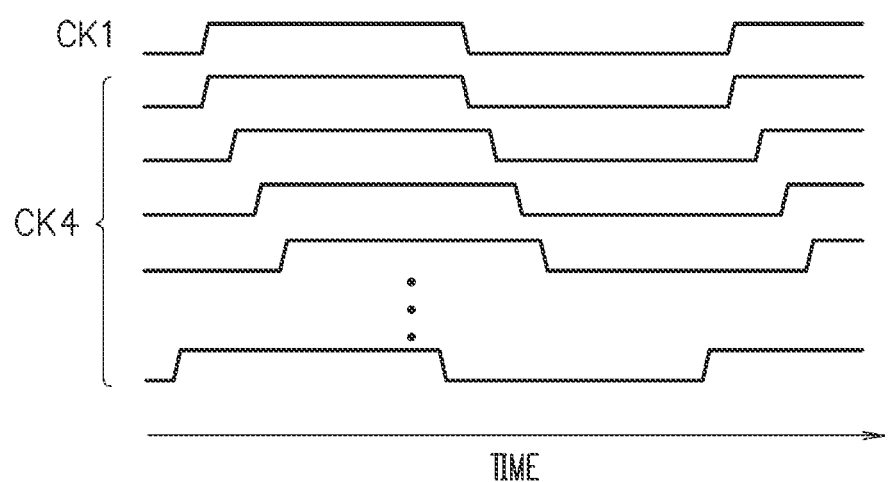
FIG. 3 is a view illustrating a phase relationship between a reference clock signal and a clock signal.

FIG. 3 is a view illustrating the phase relationship between the reference clock signal CK1 and the clock signal CK4. The frequencies of the clock signals CK1 and CK4 are the same as each other, which are 32.768 MHz, for example. In the case of the radio communication circuit 101 in FIG. 1, the phase relationship between the reference clock signal CK1 and the clock signal CK4 is not definitive. There are 20 different phases that the clock signal CK4 can take with respect to the reference clock signal CK1.

The clock signal CK4 is a clock signal obtained by dividing the frequency of the clock signal CK3 by the frequency dividing circuit 127. The clock signal CK3 is a clock signal generated by the phase locked loop circuit 123 based on the reference clock signal CK1. Therefore, the phase of the clock signal CK4 with respect to the reference clock signal CK1 changes each time the radio communication circuit 101 is activated, depending on initial conditions such as the timing of resetting the radio communication circuit 101 and device noise. The clock signal CK4 and the internal state of the analog-to-digital converter circuit 115 are synchronized, and thus, there are 20 different phase relationships between the reference clock signal CK1 and the operations of the analog-to-digital converter circuit 115 and the demodulation circuit 116. Then, the reception sensitivity of the radio communication circuit 101 changes in each of the 20 phase relationships.

Then, for example, considering that the radio communication circuit 101 is screened for defects at the time of shipment in order to guarantee its performance in fields, the radio communication circuit 101 needs to be tested for the 20 different phase relationship cases. This increases shipping test costs.

FIG. 4 is a diagram illustrating a configuration example of a radio communication circuit 101 according to a second comparative example for solving the problem that the phase relationship between the clock signals CK1 and CK4 is uncertain. The radio communication circuit 101 in FIG. 4 is that the frequency dividing circuit 127 is deleted from the radio communication circuit 101 in FIG. 1. There are explained differences of the radio communication circuit 101 in FIG. 4 from the radio communication circuit 101 in FIG. 1.

The frequency dividing circuit 126 outputs the clock signal CK4 obtained by dividing the frequency of the clock signal CK3 by 20 to the phase detection circuit 124 and the demodulation circuit 116. For example, the frequency of the clock signal CK3 is 655.36 MHz and the frequency of the clock signal CK4 is 32.768 MHz. The phase detection circuit 124 outputs a voltage indicating the phase difference between the clock signals CK1 and CK4 to the voltage-controlled oscillation circuit 125. The phase locked loop circuit 123 performs a feedback so as to make the phase difference between the clock signals CK1 and CK4 approach 0, so that in a steady state, the phases of the clock signals CK1 and CK4 match each other.

Further, the frequency dividing circuit 126 repeatedly counts the count value from 0 to 19 based on the clock signal CK3, and outputs the count value to the ADCC 128. The ADCC 128 outputs the conversion trigger signal STC to the analog-to-digital converter circuit 115 based on the clock signal CK3 and the count value from the frequency dividing circuit 126. Thereby, the sampling of the analog-to-digital converter circuit 115 and the processing of the demodulation circuit 116 are synchronized. The relationship between the clock signal CK4 and the conversion trigger signal STC is the same as in FIG. 2.

The phase locked loop circuit 123 performs control so as to make the phase difference between the clock signals CK1 and CK4 approach 0, so that the phase relationship between the clock signals CK1 and CK4 is always the same. Therefore, the radio communication circuit 101 in FIG. 4 can solve the problem that the phase relationship between the clock signals CK1 and CK4 in the radio communication circuit 101 in FIG. 1 is uncertain.

For the phase locked loop circuit 118, for example, a decimal frequency division type is used to tune to reception channel frequencies at 5 MHz intervals. The decimal frequency division type (fractional frequency division type) phase locked loop circuit 118 needs the delta-sigma modulation circuit 122, which is relatively large in logic scale. The delta-sigma modulation circuit 122 is driven by the feedback clock signal CK5 input to the phase detection circuit 119, to thus consequently operate in synchronization with 32.768 MHz of the reference clock signal CK1.

That is, the delta-sigma modulation circuit 122, the analog-to-digital converter circuit 115, and the demodulation circuit 116 are driven by the rising edge of the reference clock signal CK1. The frequency of the reference clock signal CK1 is 32.768 MHz, for example.

The delta-sigma modulation circuit 122, the analog-to-digital converter circuit 115, and the demodulation circuit 116 that operate in synchronization with the reference clock signal CK1 of 32.768 MHz generate harmonics that are an integral multiple of 32.768 MHz. Therefore, in the dedicated short-range communication, for example, the delta-sigma modulation circuit 122, the analog-to-digital converter circuit 115, and the demodulation circuit 116 generate harmonic noise around 32.768 MHz×177=5799.936 GHz. This harmonic noise is injected into a reception unit (for example, the quadrature mixer circuit 112) of the radio communication circuit 101 to degrade the reception sensitivity of the 5800 MHZ channel of the radio communication circuit 101.

The amount of electric charge that the demodulation circuit 116 draws from a power supply in the cycle of the clock signal CK4 of 32.768 MHz varies from moment to moment depending on the contents of processing, and can be regarded as noise. The amount of electric charge that the delta-sigma modulation circuit 122 draws from the power supply in the cycle of the clock signal CK5 of 32.768 MHz differs each time according to the internal state of the delta-sigma modulation circuit 122, and thus it has to be regarded as noise rather than cyclic.

The analog-to-digital converter circuit 115 draws an electric charge from the variable gain amplifier circuit 114 in the previous stage with sampling. The amount of electric charge to be drawn at this time can be noise because it depends on the amount of electric charge sampled one step before and the voltage currently being converted.

The higher frequency components of the noises generated in the delta-sigma modulation circuit 122, the analog-to-digital converter circuit 115, and the demodulation circuit 116, which are synchronized with the above reference clock signal CK1, become noise in the reception unit of the radio communication circuit 101 through any path. There are various paths through which these noises can be transmitted to the reception unit of the radio communication circuit 101, such as a path through a power supply wiring, a path through a signal path, a path through spatial coupling, and a path through a silicon substrate. However, in the case of SoC, where all the components of the radio communication circuit 101 are integrated on a single silicon die, there is a limit to reducing the degree of coupling between the above-described three clock synchronization circuits and the reception unit of the radio communication circuit 101, which is the main cause of degradation of the reception sensitivity of the radio communication circuit 101. Embodiments for solving this problem will be explained below.

Figure 5:
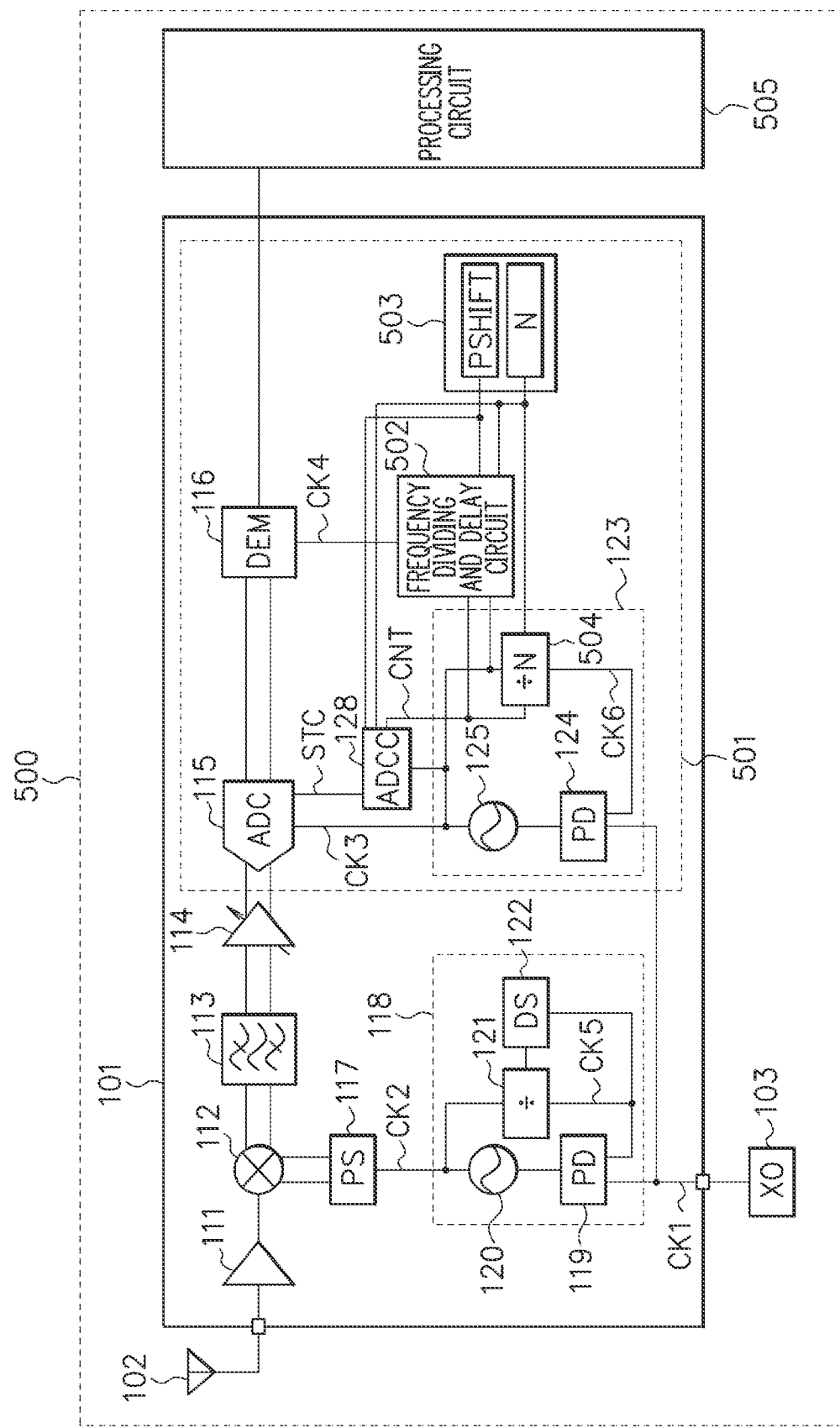
FIG. 5 is a diagram illustrating a configuration example of a semiconductor integrated circuit according to this embodiment.

FIG. 5 is a diagram illustrating a configuration example of a semiconductor integrated circuit 500 according to this embodiment. The semiconductor integrated circuit 500 includes a radio communication circuit 101, an antenna 102, an oscillation circuit 103, and a processing circuit 505. The processing circuit 505 is, for example, a microcontroller, a DSP (Digital Signal Processor), or a central processing unit (CPU).

With the miniaturization of a silicon CMOS process, the radio communication circuit 101 can be integrated on a single-chip silicon die. Its application range extends up to the dedicated short-range communication. For example, the dedicated short-range communication semiconductor integrated circuit 500 includes a 5.8 GHz band quadrature mixer circuit 112, a demodulation circuit 116, the processing circuit (microcontroller) 505 that is in charge of system control, and a flash memory, and is implemented in the form of SoC.

The radio communication circuit 101 in FIG. 5 is that the frequency dividing circuit 126 is deleted from and a frequency dividing and delay circuit 502, a nonvolatile memory 503, and a frequency dividing circuit 504 are added to the radio communication circuit 101 in FIG. 4.

The antenna 102, the oscillation circuit 103, and the processing circuit 505 are connected to the radio communication circuit 101. The radio communication circuit 101 includes a low noise amplifier circuit 111, the quadrature mixer circuit 112, a band-pass filter circuit 113, a variable gain amplifier circuit 114, a phase shift circuit 117, a phase locked loop circuit 118, and a processing circuit 501. The processing circuit 501 includes an analog-to-digital converter circuit 115, the demodulation circuit 116, a phase locked loop circuit 123, an ADCC 128, the frequency dividing and delay circuit 502, and the nonvolatile memory 503.

The antenna 102, the low noise amplifier circuit 111, the quadrature mixer circuit 112, the band-pass filter circuit 113, the variable gain amplifier circuit 114, the analog-to-digital converter circuit 115, and the demodulation circuit 116 are the same as those illustrated in FIG. 1 and FIG. 4. Further, the phase shift circuit 117 and the phase locked loop circuit 118 are also the same as those illustrated in FIG. 1 and FIG. 2.

The nonvolatile memory 503 stores a phase shift set value (phase shift set signal) PSHIFT and a frequency division ratio (frequency set signal) N. The phase shift set value PSHIFT and the frequency division ratio N can be stored as different values for each manufactured individual of the radio communication circuit 101. The nonvolatile memory 503 outputs the phase shift set value (phase shift set signal) PSHIFT to the frequency dividing and delay circuit 502, and outputs the frequency division ratio (frequency set signal) N to the frequency dividing circuit 504. The phase shift set value PSHIFT is a set value indicating the phase difference between the reference clock signal CK1 and the clock signal CK4. The frequency division ratio N is a frequency division ratio of the frequency dividing circuit 504. The frequency division ratio N is a frequency ratio of the clock signal CK3 to the clock signal CK6, that is, a frequency ratio of the clock signal CK3 to the reference clock signal CK1.

The phase locked loop circuit 123 includes a phase detection circuit 124, a voltage-controlled oscillation circuit 125, and a frequency dividing circuit 504. The phase locked loop circuit 123 is a clock generating circuit, and generates a clock signal CK3 having a frequency higher than that of the reference clock signal CK1 based on the reference clock signal CK1 and the frequency division ratio N.

The phase detection circuit 124 detects the phase difference between the reference clock signal CK1 and the clock signal CK 6 and outputs a voltage based on the phase difference to the voltage-controlled oscillation circuit 125. The voltage-controlled oscillation circuit 125 generates a clock signal CK3 having a frequency based on that voltage. The frequency dividing circuit 504 outputs a clock signal CK6, which is obtained by dividing the frequency of the clock signal CK3 by N based on the frequency division ratio N stored in the nonvolatile memory 503, to the phase detection circuit 124. When the frequency division ratio N is 20, for example, the frequency dividing circuit 504 divides the frequency of the clock signal CK3 by 20 to generate the clock signal CK6. The frequency ratio of the clock signal CK3 to the clock signal CK6 is N times. Therefore, the frequency ratio of the clock signal CK3 to the reference clock signal CK1 is also N times. The phase locked loop circuit 123 performs a feedback control so as to make the phase difference between the clock signals CK1 and CK6 approach 0, and generates the clock signal CK3. In a steady state, the phases of the clock signals CK1 and CK6 match each other.

For example, the frequencies of the reference clock signal CK1 and the clock signal CK6 are 32.768 MHz. When the frequency division ratio N is 20, the frequency of the clock signal CK3 is 655.36 MHz. The frequency division ratio N is a frequency set value for setting the frequency of the clock signal CK3.

Further, the frequency dividing circuit 504 repeatedly counts a count value CNT from 0 to N−1 based on the clock signal CK3, and outputs the count value CNT to the ADCC 128 and the frequency dividing and delay circuit 502.

Figure 6:
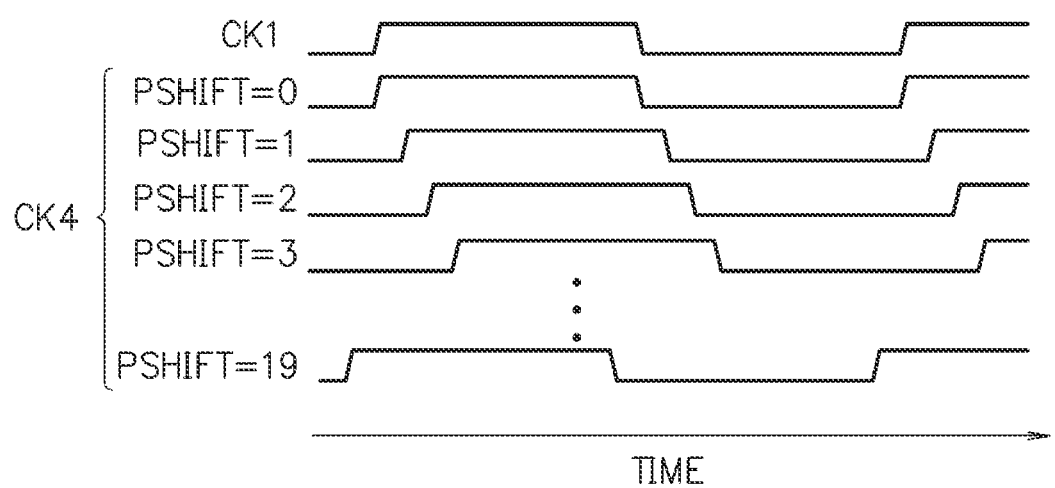
FIG. 6 is a view illustrating a phase relationship of clock signals.

As illustrated in FIG. 6, the frequency dividing and delay circuit 502 generates a clock signal CK4 having a frequency lower than that of the clock signal CK3 so that the clock signal CK4 has a phase difference with the reference clock signal CK1 by dividing the frequency of the clock signal CK3 by N and delaying it based on the phase shift set value PSHIFT and the frequency division ratio N stored in the nonvolatile memory 503 and the count value CNT from the frequency dividing circuit 504. The count value CNT from the frequency dividing circuit 504 is a count value from 0 to N−1 based on the frequency division ratio N.

For example, the frequency of the reference clock signal CK1 is 32.768 MHz. When the frequency division ratio N is 20, a frequency CK3 of the clock signal CK3 is 655.36 MHz. The frequency of the clock signal CK4 is the same as that of the reference clock signal CK1, which is 32.768 MHz.

The phase shift set value PSHIFT is a value from 0 to N−1. When the frequency division ratio N is 20, the phase shift set value PSHIFT is a value from 0 to 19. The clock signal CK4 differs in phase difference from the clock signal CK1 according to the phase shift set value PSHIFT.

When the phase shift set value PSHIFT is 0, the phase difference of the clock signal CK4 with respect to the clock signal CK1 is 0. When the phase shift set value PSHIFT is 1, the phase difference of the clock signal CK4 with respect to the clock signal CK1 is one cycle of the clock signal CK3. When the phase shift set value PSHIFT is 2, the phase difference of the clock signal CK4 with respect to the clock signal CK1 is two cycles of the clock signal CK3. As described above, the clock signal CK4 is phase-shifted with respect to the clock signal CK1 by the number of cycles of the clock signal CK3 corresponding to the phase shift set value PSHIFT.

Figure 8:
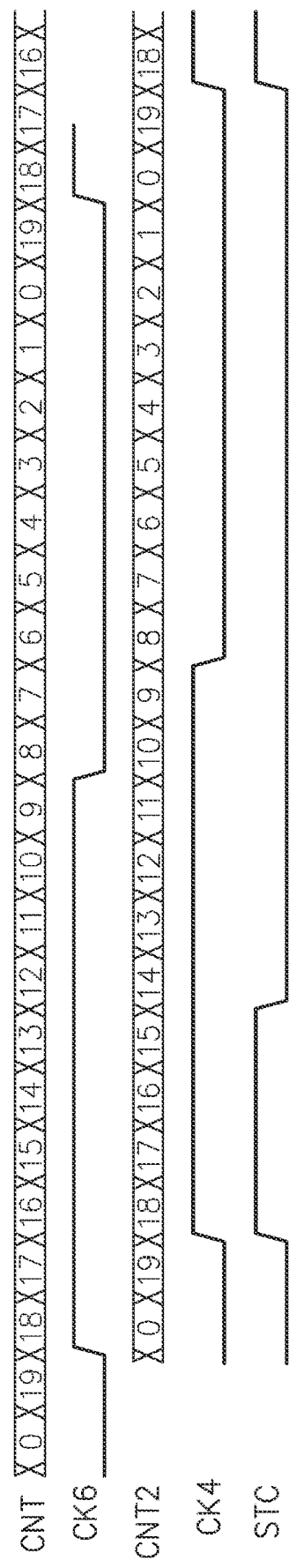
FIG. 8 is a timing chart illustrating operation examples of the frequency dividing circuit, the frequency dividing and delay circuit, and the ADCC.

The ADCC 128 is an analog-to-digital converter controller (control circuit), and generates a conversion trigger signal STC so that the conversion trigger signal STC has the same cycle and the same phase as the clock signal CK4 based on the count value CNT from the frequency dividing circuit 504, the phase shift set value PSHIFT, and the clock signal CK3, as illustrated in FIG. 8.

The conversion trigger signal STC has the same cycle as the clock signal CK4. Further, the conversion trigger signal STC also has the same phase as the clock signal CK4 based on the phase shift set value PSHIFT. For example, as in FIG. 6, when the phase shift set value PSHIFT is 0, the phase difference of the conversion trigger signal STC with respect to the clock signal CK1 is 0. When the phase shift set value PSHIFT is 1, the phase difference of the conversion trigger signal STC with respect to the clock signal CK1 is one cycle of the clock signal CK3. When the phase shift set value PSHIFT is 2, the phase difference of the conversion trigger signal STC with respect to the clock signal CK1 is two cycles of the clock signal CK3. Incidentally, the conversion trigger signal STC does not need to have the same phase as the clock signal CK4, and may have a certain phase difference.

The ADCC 128 outputs the conversion trigger signal STC to the analog-to-digital converter circuit 115. The conversion trigger signal STC is a signal indicating a sampling period and a conversion period for analog-to-digital conversion, as illustrated in FIG. 2. The high level period of the conversion trigger signal STC indicates the sampling period, and the low level period thereof indicates the conversion period.

The analog-to-digital converter circuit 115 converts analog I and Q signals into digital I and Q signals based on the clock signal CK3 and the conversion trigger signal STC. Specifically, the analog-to-digital converter circuit 115 samples the analog signal in the sampling period indicated by the conversion trigger signal STC and performs a binary search for analog-to-digital conversion in the conversion period indicated by the conversion trigger signal STC.

The demodulation circuit 116 is a digital signal processing circuit, and executes processing according to the digital signal output from the analog-to-digital converter circuit 115 based on the clock signal CK4. Specifically, the demodulation circuit 116 performs ASK demodulation processing or QPSK demodulation processing on the digital I signal and Q signal output from the analog-to-digital converter circuit 115 based on the clock signal CK4 to restore data. The demodulation circuit 116 then outputs the restored data to the processing circuit 505 as an output signal of the radio communication circuit 101. The processing circuit 505 performs various processing on the output signal from the demodulation circuit 116.

As described above, the delta-sigma modulation circuit 122 is driven by the rising edge of the reference clock signal CK1. In contrast to this, as described above, the analog-to-digital converter circuit 115 is driven by the rising edge of the conversion trigger signal STC. The demodulation circuit 116 is driven in synchronization with the clock signal CK4.

The frequency dividing and delay circuit 502 generates a clock signal CK4 having a phase difference with the reference clock signal CK1 based on the phase shift set value PSHIFT. The ADCC 128 generates a conversion trigger signal STC having a phase difference with the reference clock signal CK1 based on the phase shift set value PSHIFT. The phase difference between the reference clock signal CK1 and the conversion trigger signal STC is the same as the phase difference between the reference clock signal CK1 and the clock signal CK4.

Therefore, the clock signal CK4 and the conversion trigger signal STC can be made different in phase with respect to the reference clock signal CK1. Thereby, the driving timing of the analog-to-digital converter circuit 115 and the driving timing of the demodulation circuit 116 can be made different from the driving timing of the delta-sigma modulation circuit 122. The radio communication circuit 101 can reduce noise and inhibit degradation of reception sensitivity.

The radio communication circuit 101 can arbitrarily set the relationship between the drive phase of the delta-sigma modulation circuit 122, which is synchronized with the reference clock signal CK1, and the drive phases of the analog-to-digital converter circuit 115 and the demodulation circuit 116, which are synchronized with the clock signal CK4, according to the phase shift set value PSHIFT.

Incidentally, the phase difference of the clock signal CK4 with respect to the reference clock signal CK1 and the phase difference of the conversion trigger signal STC with respect to the reference clock signal CK1 may be different from each other.

Figure 7:
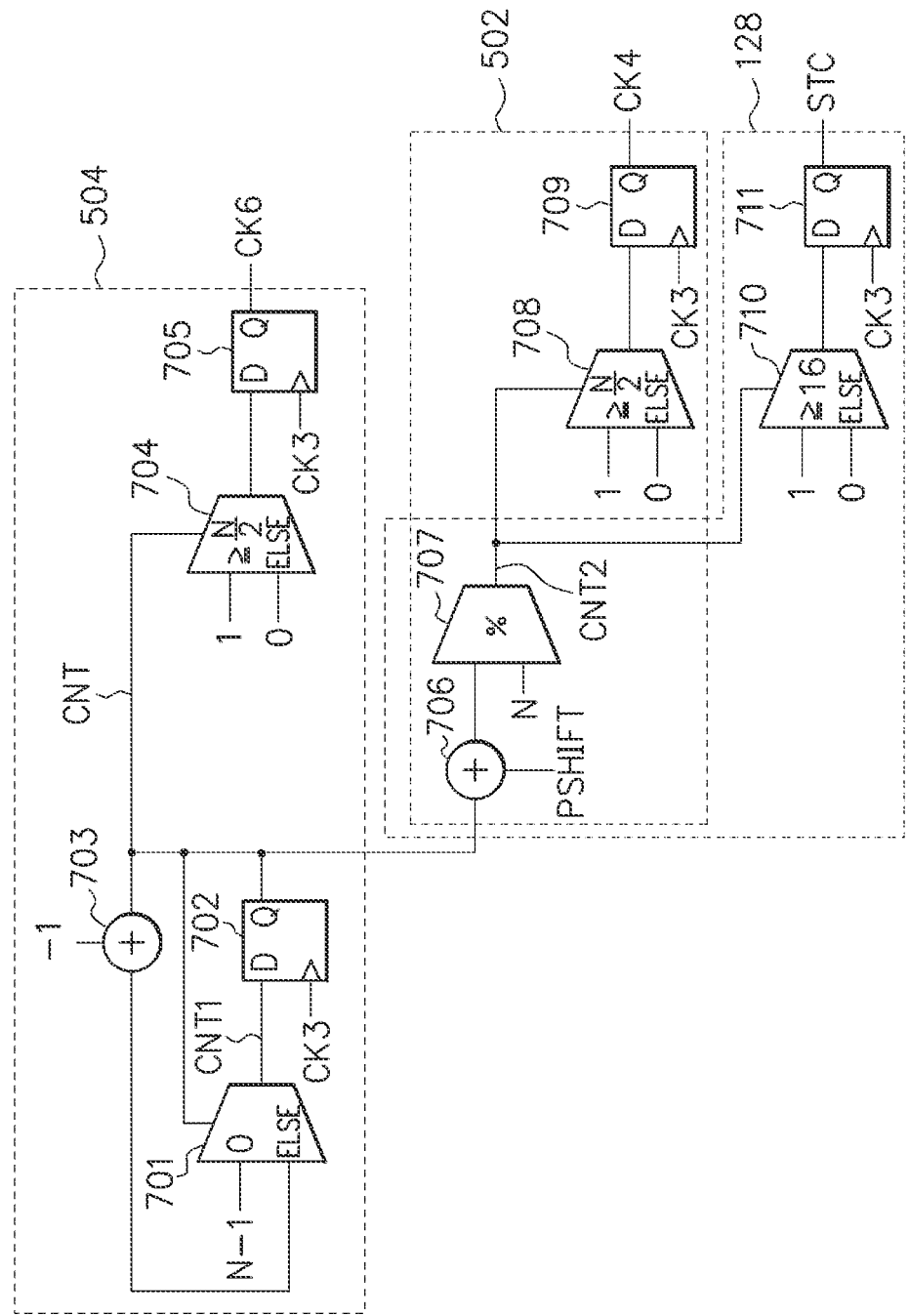
FIG. 7 is a view illustrating configuration examples of a frequency dividing circuit, a frequency dividing and delay circuit, and an ADCC.

FIG. 7 is a diagram illustrating configuration examples of the frequency dividing circuit 504, the frequency dividing and delay circuit 502, and the ADCC 128 in FIG. 5. The frequency dividing circuit 504 includes a selector 701, a register 702, a subtracter 703, a selector 704, and a register 705. The frequency dividing and delay circuit 502 includes an adder 706, a remainder operator 707, a selector 708, and a register 709. The ADCC 128 includes the adder 706, the remainder operator 707, a selector 710, and a register 711. The frequency dividing and delay circuit 502 and the ADCC 128 share the adder 706 and the remainder operator 707.

FIG. 8 is a timing chart illustrating operation examples of the frequency dividing circuit 504, the frequency dividing and delay circuit 502, and the ADCC 128 in FIG. 7, where the frequency division ratio N is 20 and the phase shift set value PSHIFT is 2.

The selector 701, the register 702, and the subtracter 703 configure a counter that counts the count value CNT. In an initial state, the selector 701 outputs N−1 to the register 702 as a count value CNT1. When the frequency division ratio N is 20, the selector 702 outputs the count value CNT1 of 19. When receiving the rising edge of the clock signal CK3, the register 702 holds N−1 input from the selector 701 and outputs held N−1 as the count value CNT.

The subtracter 703 outputs a value obtained by subtracting 1 from the count value CNT to the selector 701. When the count value CNT is 19, the subtracter 703 outputs 18. Since the count value CNT is not 0, the selector 701 outputs 18 output from the subtracter 703 to the register 702. When receiving the rising edge of the clock signal CK3, the register 702 holds 18 input from the selector 701 and outputs held 18 as the count value CNT.

As described above, the selector 701 outputs the output value from the subtracter 703 to the register 702 when the count value CNT is not 0, and the selector 701 outputs N−1 to the register 702 when the count value CNT is 0. When receiving the rising edge of the clock signal CK3, the register 702 holds the value input from the selector 701 and outputs the held value as the count value CNT. As a result, each time the rising edge of the clock signal CK3 is input to the register 702, the count value CNT is decremented and repeated in the order of 19, 18, 17, . . . , 0, 19, 18, . . . . The counter of the frequency dividing circuit 504 is a binary counter that completes one round in 20 cycles.

The selector 704 and the register 705 are a logic circuit for generating the clock signal CK6. The selector 704 outputs 1 to the register 705 when the count value CNT is N/2 or more, and the selector 704 outputs 0 to the register 705 when the count value CNT is less than N/2. When receiving the rising edge of the clock signal CK3, the register 705 holds the output value from the selector 704 and outputs the held output value as the clock signal CK6. The clock signal CK6 is a signal obtained by dividing the frequency of the clock signal CK3 by N.

Incidentally, when N/2 is not an integer, the selector 704 may output 1 or 0, depending on whether or not the count value CNT is equal to or more than an integer by rounding, rounding down, or rounding up the decimal value of N/2. Further, the selector 704 may output 1 or 0, depending on whether or not the count value CNT is equal to or more than a fixed value (for example, 10).

The adder 706 outputs a value CNT+PSHIFT obtained by adding the count value CNT and the phase shift set value PSHIFT. The phase shift set value PSHIFT is 2, for example.

The remainder operator 707 outputs the remainder obtained by dividing the value CNT+PSHIFT output from the adder 706 by the frequency division ratio N as a count value CNT2, as illustrated in the following equation. Here, % indicates a remainder operation.

CNT2=(CNT+PSHIFT) % N

The selector 708 and the register 709 generate a clock signal CK4 based on the count value CNT2. The selector 708 outputs 1 to the register 709 when the count value CNT2 is N/2 or more, and the selector 708 outputs 0 to the register 709 when the count value CNT2 is less than N/2. When receiving the rising edge of the clock signal CK3, the register 709 holds the output value from the selector 708 and outputs the held output value as the clock signal CK4. The clock signal CK4 is a signal obtained by shifting the phase of the clock signal CK6 by the phase shift set value PSHIFT, and has the same cycle as the clock signal CK6. The phase locked loop circuit 123 performs a feedback so as to make the phase difference between the clock signals CK1 and CK6 approach 0, and in a steady state, the phases of the clock signals CK1 and CK6 match each other, and thus, the clock signal CK4 is a signal obtained by shifting the phase of the clock signal CK1 by the phase shift set value PSHIFT.

That is, the adder 706 and the remainder operator 707 function as a phase shift setting circuit that sets the phase difference between the clock signal CK6 and the clock signal CK4, namely, the phase difference between the clock signal CK1 and the clock signal CK4, based on the phase shift set value PSHIFT.

Incidentally, when N/2 is not an integer, the selector 708 may output 1 or 0, depending on whether or not the count value CNT2 is equal to or more than an integer by rounding, rounding down, or rounding up the decimal value of N/2. Further, the selector 708 may output 1 or 0, depending on whether or not the count value CNT2 is equal to or more than a fixed value (for example, 10).

The selector 710 and the register 711 generate a conversion trigger signal STC based on the count value CNT2. The selector 710 outputs 1 to the register 711 when the count value CNT2 is 16 or more, and the selector 710 outputs 0 to the register 711 when the count value CNT2 is less than 16. When receiving the rising edge of the clock signal CK3, the register 711 holds the output value from the selector 710 and outputs the held output value as the conversion trigger signal STC. The phase of the conversion trigger signal STC is the same as that of the clock signal CK4, and is the phase made by shifting the phase of the clock signal CK6 by the phase shift set value PSHIFT. The cycle of the conversion trigger signal STC is the same as that of the clock signals CK6 and CK4. The phase locked loop circuit 123 performs a feedback so as to make the phase difference between the clock signals CK1 and CK6 approach 0, and in a steady state, the phases of the clock signals CK1 and CK6 match each other, and thus, the conversion trigger signal STC is a signal obtained by shifting the phase of the clock signal CK1 by the phase shift set value PSHIFT.

That is, the adder 706 and the remainder operator 707 function as a phase shift setting circuit that sets the phase difference between the clock signal CK6 and the conversion trigger signal STC, namely, the phase difference between the clock signal CK1 and the conversion trigger signal STC, based on the phase shift set value PSHIFT.

Incidentally, in FIG. 7, since the adder 706 and the remainder operator 707 are shared by the frequency dividing and delay circuit 502 and the ADCC 128, the phase of the conversion trigger signal STC is the same as that of the clock signal CK4, which is not limited to this aspect. For example, there is employed such a circuit configuration in which a circuit block of the adder 706 and the remainder operator 707 is provided for each of the frequency dividing and delay circuit 502 and the ADCC 128, and in the adder 706 of at least one of the circuit blocks, a certain offset value is added to the phase shift set value PSHIFT, and thereby, the phases of the conversion trigger signal STC and the clock signal CK4 can be made different.

FIG. 9A and FIG. 9B each are a timing chart illustrating examples of the clock signal CK1, the clock signal CK4, a current IDD1, a current IDD4, and a current IDD1+IDD4. The current IDD1 indicates the current that flows through the delta-sigma modulation circuit 122 to be driven by the phase of the clock signal CK1. The current IDD4 indicates the current that flows through the analog-to-digital converter circuit 115 and the demodulation circuit 116 to be driven by the phase of the clock signal CK4. The current IDD1+IDD4 indicates the sum of the current IDD1 and the current IDD4. The currents IDD1 and IDD4 are closely similar in current waveform that is a sawtooth wave. The amplitudes of the current IDD1 and the current IDD4 are simplified to be equal to each other.

FIG. 9A is a timing chart in the case where the phase of the clock signal CK4 with respect to the reference clock signal CK1 is 0°, and is a timing chart in the case of the radio communication circuit 101 according to the second comparative example in FIG. 4. The phase difference between the reference clock signal CK1 and the clock signal CK4 is 0°.

FIG. 9B is a timing chart in the case where the phase difference of the clock signal CK4 with respect to the reference clock signal CK1 is 180°, and is a timing chart in the case of the radio communication circuit 101 according to this embodiment in FIG. 5. The phase difference between the reference clock signal CK1 and the clock signal CK4 can be set by the phase shift set value PSHIFT, and is 180°.

The current IDD1+IDD4 in FIG. 9B has half the amplitude and half the cycle of the current IDD1+IDD4 in FIG. 9A. When the reference clock signal CK1 and the clock signal CK4 are 32.768 MHz, the 177th harmonic of 32.768 MHz approximately coincides with the 5800 MHZ channel of the dedicated short-range communication.

Therefore, in the radio communication circuit 101 in FIG. 4 corresponding to FIG. 9A, when harmonics are injected into the reception unit (for example, the quadrature mixer circuit 112), they become noise and degrade the reception sensitivity. The amplitude of the nth harmonic of the sawtooth wave is 1/n, and thus, if the amplitude of the first harmonic is 1, the amplitude of the 177th harmonic is 1/177. Since the reception unit of the radio communication circuit 101 is a circuit that processes weak signals input from the antenna 102, it is sensitive to slight noise injection. Therefore, the reception sensitivity of the radio communication circuit 101 in FIG. 4 corresponding to FIG. 9A degrades.

In the radio communication circuit 101 in FIG. 5 corresponding to FIG. 9B, the amplitudes of the current IDD1 and the current IDD4 are assumed to be equal to each other. In this case, the current IDD1+IDD4 has sawtooth waves of 32.768 MHz×2=65.536 MHz as a current waveform, and the nth harmonic does not collide with the 5800 MHZ channel. Therefore, the radio communication circuit 101 in FIG. 5 corresponding to FIG. 9B has no degradation of reception sensitivity.

In FIG. 9A and FIG. 9B, the explanation has been made with the simplified model as above. In reality, the current IDD1 and the current IDD4 do not have sawtooth waves but are more complex. The amplitudes of the current IDD1 and the current IDD4 are not the same. Therefore, in the radio communication circuit 101 in FIG. 5, the influence of harmonic noise at 5800 MHz, for example, does not always disappear completely. However, the radio communication circuit 101 in FIG. 5 can reduce the sensitivity degradation problem caused by the synchronization circuit of the reference clock signal CK1 and the synchronization circuit of the clock signal CK4 by adjusting the phase shift set value PSHIFT to set it to an optimal phase shift set value PSHIFT.

As above, the radio communication circuit 101 in FIG. 5 can control the harmonic noise and inhibit the degradation of reception sensitivity by driving the delta-sigma modulation circuit 122, the analog-to-digital converter circuit 115, and the demodulation circuit 116 by different phases.

FIG. 10A and FIG. 10B each are a timing chart illustrating an operation example of the radio communication circuit 101 in FIG. 5. FIG. 10A and FIG. 10B each are a timing chart illustrating examples of the clock signal CK3, the conversion trigger signal STC, the internal state of the analog-to-digital converter controller 115, and the current IDD10 or IDD11.

FIG. 10A is a timing chart in the case where the frequency division ratio N is 20. The cycle of the conversion trigger signal STC is 20 times the cycle of the clock signal CK3. The high level period of the conversion trigger signal STC indicates a sampling period Ts1 of the analog-to-digital converter circuit 115. In the sampling period Ts1, the analog-to-digital converter circuit 115 acquires an electric charge of the analog signal.

The low level period of the conversion trigger signal STC indicates a conversion period Tc1 of the analog-to-digital converter circuit 115. In the conversion period Tc1, the analog-to-digital converter circuit 115 searches for a digital value corresponding to the amount of electric charge of the analog signal acquired as above.

The sum of the sampling period Ts1 and the conversion period Tc1 corresponds to 20 cycles of the clock signal CK3. The selector 710 in FIG. 7 outputs 0 when the count value CNT2 is less than 16. Therefore, the conversion period Tc1 corresponds to 16 cycles of the clock signal CK3. Therefore, the sampling period Ts1 corresponds to 4 (=20-16) cycles of the clock signal CK3. The analog-to-digital converter circuit 115 performs analog-to-digital conversion at a sampling rate of 20 cycles (32.768 MHz).

The current IDD10 is the current that flows through the analog-to-digital converter circuit 115 when the frequency division ratio N is 20. The current IDD10 has a peak at the start of the sampling period Ts1 and a peak at the start of the conversion period Tc1. At the start of the sampling period Ts1, the analog-to-digital converter circuit 115 initializes the internal circuit and acquires the electric charge of the analog signal, and thus, the current IDD10 has a peak. Further, at the start of the conversion period Tc1, the analog-to-digital converter circuit 115 causes switching of a capacitor element corresponding to the most significant bit, and thus, the current IDD10 has a peak. As a result, the current IDD10 has two peaks.

FIG. 10B is a timing chart in the case where the frequency division ratio N is 30. The cycle of the conversion trigger signal STC is 30 times the cycle of the clock signal CK3. The high level period of the conversion trigger signal STC indicates a sampling period Ts2 of the analog-to-digital converter circuit 115. In the sampling period Ts2, the analog-to-digital converter circuit 115 acquires an electric charge of the analog signal.

The low level period of the conversion trigger signal STC indicates a conversion period Tc2 of the analog-to-digital converter circuit 115. In the conversion period Tc2, the analog-to-digital converter circuit 115 searches for a digital value corresponding to the amount of electric charge of the analog signal acquired as above.

The sum of the sampling period Ts2 and the conversion period Tc2 corresponds to 30 cycles of the clock signal CK3. The selector 710 in FIG. 7 outputs 0 when the count value CNT2 is less than 16. Therefore, the conversion period Tc2 corresponds to 16 cycles of the clock signal CK3. Therefore, the sampling period Ts2 corresponds to 14 (=30-16) cycles of the clock signal CK3. The analog-to-digital converter circuit 115 performs analog-to-digital conversion at a sampling rate of 30 cycles (32.768 MHz).

The current IDD11 is the current that flows through the analog-to-digital converter circuit 115 when the frequency division ratio N is 30. The current IDD11 has a peak at the start of the sampling period Ts2 and a peak at the start of the conversion period Tc2, similarly to the current IDD10.

The cycle of the conversion trigger signal STC in FIG. 10B is the same as that of the conversion trigger signal STC in FIG. 10A. The cycle of the clock signal CK3 in FIG. 10B is 20/30 times the cycle of the clock signal CK3 in FIG. 10A.

The conversion periods Tel and Tc2 are constant, which are 16 cycles, regardless of the frequency division ratio N. The frequency of the clock signal CK3 varies according to the frequency division ratio. The frequencies of the clock signal CK4 and the conversion trigger signal STC are constant, regardless of the frequency division ratio N.

In the successive approximation type analog-to-digital converter circuit 115, it is rational to set the number of cycles of the conversion periods Tc1 and Tc2 to a fixed value (for example, 16 cycles) regardless of the frequency division ratio N. The reason for this is that the conversion periods Tc1 and Tc2 need the highest logic speed, so that the logic needs to be simple. Therefore, there is employed the simple logic in which the conversion periods Tc1 and Tc2 have fixed cycles, regardless of the frequency division ratio N.

Here, In FIG. 10A, the sampling period Ts1 is shorter than the conversion period Tc1, the interval between the two peaks of the current IDD10 is narrow, and the two peaks are close to each other. Therefore, the current IDD10 generates the nth harmonics of 32.768 MHz. The analog-to-digital converter circuit 115 is located closest to the noise-sensitive reception unit (for example, the quadrature mixer circuit 112), and thus, noise synchronous with the conversion trigger signal STC has a large influence when it is generated.

Then, as illustrated in FIG. 10B, by setting the sampling period Ts2 and the conversion period Tc2 to have approximately the same number of cycles and widening the interval between the two peaks of the current IDD11 to separate the two peaks from each other, the current IDD11 can reduce integer multiple harmonics of 32.768 MHz.

To achieve the timing in FIG. 10B, regardless of the frequency division ratio N, the ratio between the sampling period Ts2 and the conversion period Tc2 is changed according to the frequency division ratio N while maintaining the frequency of the conversion trigger signal STC at a constant value of 32.768 MHz. When the frequency division ratio N in FIG. 10A is 20, the sampling period Ts1 has 4 cycles and the conversion period Tc1 has 16 cycles. When the frequency division ratio Nin FIG. 10B is 30, the sampling period Ts2 has 14 cycles and the conversion period Tc2 has 16 cycles.

As illustrated in FIG. 7, based on the frequency division ratio N, the ADCC 128 generates the conversion trigger signal STC by changing the ratio between the sampling period and the conversion period while maintaining the same cycle as the clock signal CK4. Based on the frequency division ratio N, the ADCC 128 generates the conversion trigger signal STC by changing the number of cycles of the sampling period while fixing the number of cycles of the conversion period with reference to the cycle of the clock signal CK3.

The radio communication circuit 101 can vary the frequency of the clock signal CK3 for the operation of the analog-to-digital converter circuit 115 according to the frequency division ratio N while maintaining the frequencies of the clock signal CK4 and the conversion trigger signal STC at 32.768 MHz.

The radio communication circuit 101 can arbitrarily set the frequency division ratio N stored in the nonvolatile memory 503. As illustrated in FIG. 10A and FIG. 10B, the conversion trigger signal STC has a fixed low level period of, for example, 16 cycles and has a high level period of N−16 cycles. Thereby, the radio communication circuit 101 can change the sampling period indicated by the high level of the conversion trigger signal STC to reduce the integer multiple harmonic noise of the 32.768 MHz channel.

The examples in FIG. 10A and FIG. 10B illustrate the effects in a simplified model. In practice, the examples in FIG. 10A and FIG. 10B are more complex, which is the same as the previously-described case of the phase shift set value PSHIFT. However, the radio communication circuit 101 can adjust the phase difference between the reference clock signal CK1 and the clock signal CK4 and the conversion trigger signal STC by using the phase shift set value PSHIFT, and can adjust the ratio between the high level period (sampling period) and the low level period (conversion period) of the conversion trigger signal STC. The phase shift set value PSHIFT enables the phase difference between the reference clock signal CK1 and the clock signal CK4 and the conversion trigger signal STC to be set. The frequency division ratio N enables the ratio between the high level period and the low level period of the conversion trigger signal STC to be adjusted. Accordingly, the radio communication circuit 101 can reduce noise and improve reception performance by setting optimal values of the phase shift set value PSHIFT and the frequency division ratio N after manufacturing.

The optimal value may vary when the transistor characteristics during the manufacture of the radio communication circuit 101 are biased to one side. In such a case, by obtaining the optimal values of the phase shift set value PSHIFT and the frequency division ratio N for each individual manufactured radio communication circuit 101 and storing the optimal values of the phase shift set value PSHIFT and the frequency division ratio N in the nonvolatile memory 503, the radio communication circuit 101 with good characteristics can be fabricated with improved manufacturing yield.

According to this embodiment, the radio communication circuit 101 has not only the effect capable of reducing the noise by the phase shift set value PSHIFT, but also the effect capable of further reducing the noise by the frequency division ratio N, thereby making it possible to inhibit the degradation of reception sensitivity. Further, it is possible to reduce the influence of noise caused by the delta-sigma modulation circuit 122, the analog-to-digital converter circuit 115, and the demodulation circuit 116 on the operation of the reception unit of the radio communication circuit 101 while controlling the costs associated with the function and performance tests of the radio communication circuit 101.

Incidentally, the above-described embodiments merely illustrate one concrete example of implementing the present invention, and the technical scope of the present invention is not to be construed in a restrictive manner by the embodiment. That is, the present invention may be implemented in various forms without departing from the technical spirit or main features thereof.

It is possible to reduce noise based on a clock signal.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processing circuit, comprising:
a clock generating circuit configured to generate, based on a reference clock signal and a frequency set signal, a first clock signal having a frequency higher than a frequency of the reference clock signal;
a frequency dividing and delay circuit configured to generate a second clock signal having a frequency lower than the frequency of the first clock signal so that the second clock signal has a first phase difference with the reference clock signal by dividing the frequency of the first clock signal and delaying the first clock signal based on a phase shift set signal and the frequency set signal;
an analog-to-digital converter circuit configured to convert an analog signal into a digital signal based on the first clock signal and a conversion trigger signal indicating a sampling period and a conversion period;
a digital signal processing circuit configured to execute processing according to the digital signal based on the second clock signal; and
a control circuit configured to generate the conversion trigger signal so that the conversion trigger signal has the same cycle as the second clock signal based on the frequency set signal and the first clock signal.

2. The processing circuit according to claim 1, wherein the control circuit is configured to generate the conversion trigger signal by changing a ratio between the sampling period and the conversion period while maintaining the same cycle as the second clock signal based on the frequency set signal.

3. The processing circuit according to claim 1, wherein the control circuit is configured to generate the conversion trigger signal so that the conversion trigger signal has a second phase difference with the reference clock signal based on the phase shift set signal.

4. The processing circuit according to claim 3, wherein the second phase difference is the same as the first phase difference.

5. The processing circuit according to claim 3, wherein the frequency dividing and delay circuit includes a first phase shift setting circuit configured to set the first phase difference based on the phase shift set signal; and
the control circuit includes a second phase shift setting circuit configured to set the second phase difference based on the phase shift set signal, and the first and second phase shift setting circuits are provided as circuits to be shared by the frequency dividing and delay circuit and the control circuit.

6. The processing circuit according to claim 1, wherein
the clock generating circuit is a phase locked loop circuit including a frequency dividing circuit, and
the frequency set signal is a signal indicating a frequency division ratio of the frequency dividing circuit.

7. The processing circuit according to claim 6, wherein
the frequency dividing circuit is configured to count a count value based on the first clock signal,
the frequency dividing and delay circuit is configured to generate the second clock signal based on the count value, and
the control circuit is configured to generate the conversion trigger signal based on the count value.

8. The processing circuit according to claim 1, wherein the first phase difference is 180°.

9. The processing circuit according to claim 1, wherein the number of cycles of the conversion period is constant regardless of the frequency set signal.

10. The processing circuit according to claim 1, wherein
the frequency of the first clock signal varies according to the frequency set signal, and
the frequency of the second clock signal is constant regardless of the frequency set signal.

11. The processing circuit according to claim 1, wherein
the digital signal processing circuit is a demodulation circuit configured to perform demodulation processing on the digital signal.

12. A radio communication circuit, comprising:
a mixer circuit configured to mix a received signal and a third clock signal, the third clock signal being generated based on a reference clock signal; and
a processing circuit configured to receive an analog signal based on an output signal of the mixer circuit, wherein
the processing circuit includes:
a first clock generating circuit configured to generate, based on the reference clock signal and a frequency set signal, a first clock signal having a frequency higher than a frequency of the reference clock signal;
a frequency dividing and delay circuit configured to generate a second clock signal having a frequency lower than the frequency of the first clock signal so that the second clock signal has a first phase difference with the reference clock signal by dividing the frequency of the first clock signal and delaying the first clock signal based on a phase shift set signal and the frequency set signal;
an analog-to-digital converter circuit configured to convert the analog signal into a digital signal based on the first clock signal and a conversion trigger signal indicating a sampling period and a conversion period;
a digital signal processing circuit configured to execute processing according to the digital signal based on the second clock signal; and
a control circuit configured to generate the conversion trigger signal so that the conversion trigger signal has the same cycle as the second clock signal based on the frequency set signal and the first clock signal.

13. The radio communication circuit according to claim 12, further comprising:
a second clock generating circuit configured to generate the third clock signal so that the third clock signal has a frequency higher than the frequency of the reference clock signal based on the reference clock signal.

14. The radio communication circuit according to claim 13, wherein
the second clock generating circuit is a decimal frequency division type or fractional frequency division type phase locked loop circuit including a delta-sigma modulation circuit configured to be driven in a phase different from a phase of at least one of the analog-to-digital converter circuit and the digital signal processing circuit.

15. The radio communication circuit according to claim 12, wherein
the control circuit is configured to generate the conversion trigger signal by changing a ratio between the sampling period and the conversion period while maintaining the same cycle as the second clock signal based on the frequency set signal.

16. The radio communication circuit according to claim 12, wherein
the control circuit is configured to generate the conversion trigger signal so that the conversion trigger signal has a second phase difference with the reference clock signal based on the phase shift set signal.

17. The radio communication circuit according to claim 12, wherein
the first clock generating circuit is a phase locked loop circuit including a frequency dividing circuit, and
the frequency set signal is a signal indicating a frequency division ratio of the frequency dividing circuit.

18. The radio communication circuit according to claim 12, wherein
the number of cycles of the conversion period is constant regardless of the frequency set signal.

19. The radio communication circuit according to claim 12, wherein
the frequency of the first clock signal varies according to the frequency set signal, and
the frequency of the second clock signal is constant regardless of the frequency set signal.

20. A semiconductor integrated circuit, comprising:
a mixer circuit configured to mix a received signal and a third clock signal;
a first processing circuit configured to receive an analog signal based on an output signal of the mixer circuit; and
a second processing circuit configured to process an output signal of the first processing circuit, wherein
the first processing circuit includes:
a clock generating circuit configured to generate, based on a reference clock signal and a frequency set signal, a first clock signal having a frequency higher than a frequency of the reference clock signal;
a frequency dividing and delay circuit configured to generate a second clock signal having a frequency lower than the frequency of the first clock signal so that the second clock signal has a first phase difference with the reference clock signal by dividing the frequency of the first clock signal and delaying the first clock signal based on a phase shift set signal and the frequency set signal;
an analog-to-digital converter circuit configured to convert the analog signal into a digital signal based on the first clock signal and a conversion trigger signal indicating a sampling period and a conversion period;
a digital signal processing circuit configured to execute processing according to the digital signal based on the second clock signal; and a control circuit configured to generate the conversion trigger signal so that the conversion trigger signal has the same cycle as the second clock signal based on the frequency set signal and the first clock signal.

* * * * *